US012393358B1

(12) United States Patent
Awbrey

(10) Patent No.: US 12,393,358 B1
(45) Date of Patent: Aug. 19, 2025

(54) USE OF AN LBA SCATTER LIST TO CALCULATE AN ADDRESS CORRESPONDING TO AN ENTRY IN THE LBA SCATTER LIST

(71) Applicant: Microchip Technology Incorporated, Chandler, AZ (US)

(72) Inventor: Brandon Awbrey, Cypress, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/772,587

(22) Filed: Jul. 15, 2024

Related U.S. Application Data

(60) Provisional application No. 63/640,525, filed on Apr. 30, 2024.

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

2019/0310947 A1* 10/2019 Raisch .................. G06F 3/0647
2021/0303189 A1    9/2021 Bae et al.

FOREIGN PATENT DOCUMENTS

EP          3945407 A1    2/2022    ............... G06F 3/06

OTHER PUBLICATIONS

NVM Express WorkGroup "NVM Express 1.2 1 NVM Express," NVMExpress Specifications, URL: http://nvmexpress.org/wp-content/uploads/NVM_Express_1_2_Gold_20141209.pdf, 205 pages, Nov. 3, 2014.
International Search Report and Written Opinion, Application No. PCT/US2024/053326, 17 pages, Jan. 23, 2025.

* cited by examiner

*Primary Examiner* — Brian R Peugh
(74) *Attorney, Agent, or Firm* — SLAYDEN GRUBERT BEARD PLLC

(57) ABSTRACT

Systems and methods for using a logical block addressing (LBA) scatter list to calculate an address corresponding to an entry in the LBA scatter list are disclosed. A system may include a non-transitory memory including machine-readable instructions that, when executed by a processor, cause the processor to allocate an LBA scatter list array and send an initializing command to a target storage device to provide to the target storage device an address to the LBA scatter list array. The instructions cause the processor to gather a plurality of read requests and select an available LBA scatter list index. The instructions cause the processor to populate a LBA list indicated by the selected LBA scatter list index and send a subsequent command to the target storage device to cause the target storage device to calculate an address corresponding to a given entry in the selected LBA scatter list index.

20 Claims, 5 Drawing Sheets

USE OF AN LBA SCATTER LIST TO CALCULATE AN ADDRESS CORRESPONDING TO AN ENTRY IN THE LBA SCATTER LIST

PRIORITY

This application claims priority to U.S. Provisional Patent Application No. 63/640,525, filed Apr. 30, 2024, the contents of which are hereby incorporated in their entirety.

TECHNICAL FIELD

The present disclosure relates to accessing data on non-volatile devices, and, in particular, to use of a logical block addressing (LBA) scatter list to calculate an address corresponding to an entry in the LBA scatter list.

BACKGROUND

Solid-state drives (SSDs) typically use a 4096 byte (4K) sector size (referred to as a block) for read and write performance. Central processing unit (CPU) based systems typically work on larger blocks. In a traditional server, the useable input/output operations per second (IOP/s) are constrained by non-linear scaling due to context switching overhead. Graphics processing units (GPUs) may have a zero overhead context switch model that can easily consume high throughput of smaller units of data. Because of the grid architecture of a GPU, similar requests for the same type of data will be operated on by the grid of GPU execution threads.

Therefore, while SSD hardware has a front end non-volatile memory express (NVMe) pipeline logic based on 4K performance targets, achieving a lower degree of granularity (such as 512 byte or 256 byte granularity) would use IOP/s targets of 8× or 16× the IOP/s targets for 4K granularity. Certain artificial intelligence (AI) applications use large memory space and achieving such memory space with dynamic random access memory (DRAM) is costly. Therefore, the solutions currently available are either too slow, or use too many drives to concentrate 4K access to 256 bytes.

SUMMARY OF THE INVENTION

Examples of the present disclosure may include an article of manufacture for use of a logical block addressing (LBA) scatter list to calculate an address corresponding to an entry in the LBA scatter list. The article of manufacture may include a non-transitory memory including machine-readable instructions that, when executed by a processor, may cause the processor to allocate a logical block array (LBA) scatter list array. The instructions may additionally cause the processor to send an initializing command to a target storage device, the initializing command to provide to the target storage device an address to the LBA scatter list array. The instructions may also cause the processor to gather a plurality of read requests and select an available LBA scatter list index. The instructions may further cause the processor to populate a LBA list indicated by the selected LBA scatter list index and send a subsequent command to the target storage device to cause the target storage device to calculate an address corresponding to a given entry in the selected LBA scatter list index.

In combination with any of the above examples, allocating the LBA scatter list array may include setting a size of the LBA scatter list array, a maximum number of entries of the LBA scatter list array, and a number of lists in the LBA scatter list array In combination with any of the above examples, the processor may be to specify a size of an offset.

In combination with any of the above examples, populating the LBA list may include populating the LBA list with the plurality of read requests.

In combination with any of the above examples, the given entry in the LBA list may include an START_OFFSET and an END_OFFSET.

In combination with any of the above examples, the processor may be to receive data from the target storage device corresponding to data requested in the given entry of the LBA scatter list index and release the selected LBA scatter list index.

In combination with any of the above examples, the subsequent command may cause the target storage device to calculate an LBA scatter list address based on a base host address and an LSLI index and request a DMA transfer from a host memory to an LBA scatter list shadow buffer.

Alone or in combination with any of the above examples, examples of the present disclosure may include a method including allocating a logical block array (LBA) scatter list array. The method may additionally include sending an initializing command to a target storage device, the initializing command to provide to the target storage device an address to the LBA scatter list array. The method may also include gathering a plurality of read requests and selecting an available LBA scatter list index. The method may further include populating a LBA list indicated by the selected LBA scatter list index and sending a subsequent command to the target storage device to cause the target storage device to calculate an address corresponding to a given entry in the selected LBA scatter list index.

In combination with any of the above examples, allocating the LBA scatter list array may include setting a size of the LBA scatter list array, a maximum number of entries of the LBA scatter list array, and a number of lists in the LBA scatter list array.

In combination with any of the above examples, the method may further include specifying a size of an offset.

In combination with any of the above examples, populating the LBA list may include populating the LBA list with the plurality of read requests.

In combination with any of the above examples, the given entry in the LBA list may include an START_OFFSET and an END_OFFSET.

In combination with any of the above examples, the method may further include receiving data from the target storage device corresponding to data requested in the given entry of the LBA scatter list index and releasing the selected LBA scatter list index.

In combination with any of the above examples, the subsequent command may cause the target storage device to calculate an LBA Scatter List address based on a base host address and an LSLI index and request a DMA transfer from a host memory to an LBA scatter list shadow buffer.

Alone or in combination with any of the above examples, examples of the present disclosure may include a method including receiving an initializing command providing an address to a logical block array (LBA) scatter list array. The method may additionally include receiving a subsequent command providing an LBA scatter list index and a base host address. The method may further include calculating an LBA scatter list address based on the base host address and the LBA scatter list index.

In combination with any of the above examples, the method may further include saving the LBA scatter list address.

In combination with any of the above examples, the method may further include allocating a total list size (TLS) of internal memory as a receive buffer for the LBA scatter list index.

In combination with any of the above examples, the method may further include initiating a read command from non-volatile media for an entry in the LBA scatter list index.

In combination with any of the above examples, the method may further include sending data to a host computer corresponding to data requested in an entry in the LBA scatter list index.

In combination with any of the above examples, the method may further include requesting a DMA transfer from a host memory to an LBA scatter list shadow buffer.

BRIEF DESCRIPTION OF THE DRAWINGS

The figures illustrate examples of systems and methods.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect of the invention, systems and methods for use of a logical block addressing (LBA) scatter list to calculate an address corresponding to an entry in the LBA scatter list are provided. The disclosed systems and methods provide for granularity in input/output (I/O) operations finer than 4K, the physical format of most non-volatile media, such as solid-state drives (SSDs), and increase the interconnect (such as Peripheral Component Interconnect Express (PCIe)) throughput. The granularity of data may be different from the size of the sector or logical block of the non-volatile media. One method of providing data granularity is to use a smaller block size. The SSD may maintain a Logical-to-Physical (L2P) table in non-volatile memory, with an entry for a given LBA. Smaller block sizes result in increased number of L2P entries, demanding more non-volatile memory and random-access-memory (RAM) for the L2P table and increasing design cost. Another method is to read from a byte offset of the LBA. An offset of a LBA is multiples of the specified offset size from the beginning of the logical block. A software algorithm may be used to read multiple small units of data from LBA offsets of a non-volatile storage device. The disclosed system and methods allow for deeper queues and parallel synchronization. These benefits are achieved at a reduced cost and increased throughput by gathering many small requests into a list and sending a single command to the storage device. Likewise, available interconnect bandwidth is conserved by using a single response message for multiple media reads.

Figure 1:
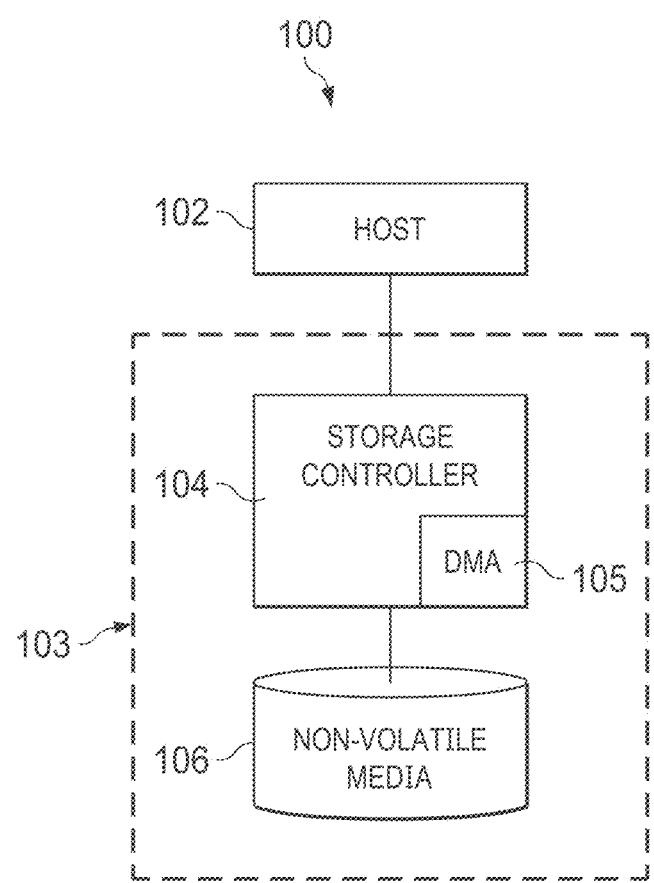
FIG. 1 shows a system comprising a host computer and a target storage device for using a logical block addressing (LBA) scatter list to calculate an address corresponding to an entry in the LBA scatter list, according to examples of the present disclosure.

FIG. 1 shows a system comprising a host computer and a target storage device for using a logical block addressing (LBA) scatter list to calculate an address corresponding to an entry in the LBA scatter list, according to examples of the present disclosure. Host computer 102 may generally include a central processing unit (CPU), a general purpose processor, a specific purpose processor, a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein, a memory such as random-access memory, a cache, storage such as a hard disk, and various inputs/outputs (not shown). Host computer 102 may generally run software including an operating system and one or more device drivers.

Target storage device 103 may include storage controller 104 and non-volatile memory 106. Target storage device 103 may be any suitable storage medium that uses block storage. For example, target storage device 103 may be a solid state drive with non-volatile storage provided by flash memory devices.

Storage controller 104 may be a central processing unit (CPU), a general purpose processor, a specific purpose processor, a microcontroller, a programmable logic controller (PLC), a digital signal processor (DSP), an application specific integrated circuit (ASIC), a graphical processing unit (GPU), a field-programmable gate array (FPGA) or other programmable logic device, discrete gate or transistor logic, discrete hardware components, other programmable device, or any combination thereof designed to perform the functions disclosed herein. Storage controller 104 may include memory, such as a non-transitory memory, such as non-volatile random-access memory (NVRAM), including machine-readable instructions that when executed by storage controller 104, may cause storage controller 104 to perform one or more actions as described herein. Storage controller 104 may also comprise direct memory access (DMA) controller 105 for coordinating DMA transfer operations. A DMA transfer may copy a range of memory from one device to another. The task of storage controller 104 may generally be to control and access non-volatile media 106 based on read and write commands sent from host computer 102.

In some examples, host computer 102 may be a graphics processing unit (GPU). GPU logic may tolerate deep queues and high latency. Therefore, the grouping of requests from GPU threads may arrive at target storage device 103 in batches. Additionally, the non-volatile memory express (NVMe) protocol specifies a 64-byte request and 16-byte response. In the READ direction, the 16-byte response may consume effective bandwidth. For example, if the request is 256 bytes, the overhead bandwidth of the response message will be 6%. By batching multiple READ requests into a single command and response, usage of the interconnect may be reduced, increasing available bandwidth for user data.

The SET_LBA_SCATTER command may be used to provide an address in the memory space of host computer 102 that corresponds to an array of logical block addressing (LBA) SCATTER lists. For this example, the array may include the addressability of up to a list of 64K (e.g., a list of 256 256-byte offsets), without limitation. The SET_LBA_SCATTER command may specify parameters OFFSET_SIZE, TOTAL_BYTES, MAX_SIZE_OF_LIST, and NUMBER_OF_ENTRIES. Target storage device 103 may accept the LBA SCATTER list retrieved from host computer 102 by the SET_LBA_SCATTER command and may either create a matching array or manage buffers of target storage device 103 delaying the transfer of the LBA SCATTER list until target storage device 103 has a slot. Each LBA scatter list entry may have a size of 64 bits. The most significate byte (MSB) of the respective LBA scatter list entry may be the START_OFFSET into the logical block. The START_OFFSET may be a multiple of the OFFSET_SIZE specified in the SET_LBA_SCATTER command (256 entries max). The next lower Byte (8 bits) may be the END_OFFSET. The END_OFFSET may range from 0 to 255.

The READ_LBA_SCATTER command may be a command to gather multiple READ requests into a single command. The READ_LBA_SCATTER command may provide a first parameter, SCATTER_LBA_INDEX, of 16 bits, and a second parameter, NUMBER_OF_ENTRIES, of 16 bits. Using the NVMe protocol, host computer 102 may provide either a scatter gather list (SGL) or a physical region page (PRP) as the destination location in host memory for the scattered list of LBAs to be transferred. A NORMAL status may be sent by target storage device 103 when all the data specified in the LBA SCATTER list have been copied to host memory, such as by using direct memory access (DMA) to host memory. In the event of an unrecoverable read error (URE), a status indicating the bit-mask on non-errored segments may be provided by target storage device 103 and host computer 102 may READ the full logical block.

In examples where target storage device 103 is a serial-attached small computer system interface (SCSI) (SAS) or serial advanced technology attachment (SATA) drive, it will have no ability to directly transfer data using a DMA transfer from host memory. In this case, host computer 102 may send a SET LBA-SCATTER LIST command to target storage device 103 that sets LBA SCATTER_LIST_INDEX (LSLI), and in the DATA-OUT phase of the SCSI command, where host computer 102 requests that target storage device 103 transfers data to host computer 102, host computer 102 may send the list of LBA_SCATTER_LIST. Upon completion of this command, host computer 102 may use the LBA READ-SCATTER-LBA command with the index number matching the LSLI set in the SET LBA-SCATTER LIST command. A static parameter may be provided by target storage device 103 to indicate the maximum number of LBA_SCATTER_LIST and OFFSET_SIZE supported.

Figure 2:
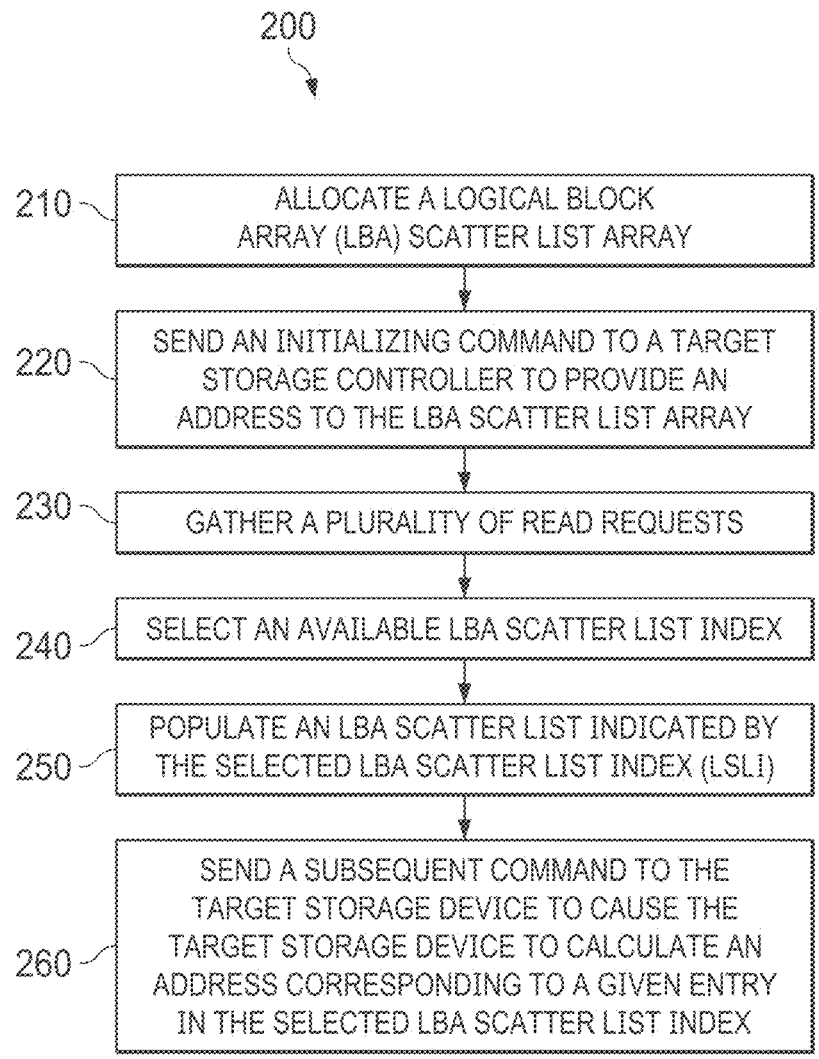
FIG. 2 illustrates a method performed for use of a logical block addressing (LBA) scatter list to calculate an address corresponding to an entry in the LBA scatter list, according to examples of the present disclosure.

FIG. 2 illustrates a method performed for use of a logical block addressing (LBA) scatter list to calculate an address corresponding to an entry in the LBA scatter list, according to examples of the present disclosure. Method 200 may be implemented using a driver on a host computer coupled to a block storage device, such as an SSD, in combination with a processor, or any other system operable to implement method 200. Although examples have been described above, other variations and examples may be made from this disclosure without departing from the spirit and scope of these disclosed examples.

At block 210, the storage controller driver running on host computer 102 may allocate a logical block array (LBA) scatter list array. The LBA scatter list array may have a size of total list size (TLS) bytes of memory. The TLS may equal the maximum number of entries per list (MLS) multiplied by the size of a single entry multiplied by the number of lists (NOL). For example, the size of a single entry may be eight bytes. After allocating the LBA scatter list array, the storage controller driver may identify a given LBA scatter list by an entry in a list index (LSLI). The list index value may begin at "0" and have a maximum value of one less than the number of lists. In some examples, block 210 may occur during system or driver initialization.

At block 220, the storage controller driver may send an initializing command to a target storage controller, such as target storage controller 104 shown in FIG. 1, to provide a base address of the LBA scatter list array. The initializing command may be a SET_LBA_SCATTER command, described above. The SET_LBA_SCATTER command may use an address of the LBA scatter list array as the data pointer, and provide the TLS, MLS and NOL values. In response to receiving the SET_LBA_SCATTER command, the storage controller may save the address to the LBA scatter list array in local memory, and may allocate TLS of internal memory as receive buffers for the LBA scatter list. The receive buffer may be referred to as an LBA scatter list shadow buffer.

At block 230, the storage controller driver may gather a plurality of read requests. The read requests may be generated by applications executing on the host computer and may seek data stored in scattered (e.g., random) locations on the target storage device. Block 230 may occur at run time.

At block 240, the storage controller driver may select an available LBA scatter list index, referenced by the list index (LSLI). For example, there may be four LBA scatter lists allocated in the LBA scatter list array. Two of the LBA scatter lists may be in use, so the storage controller drive may select one of the other two LBA scatter list indices at block 240.

At block 250, the storage controller driver may populate an LBA scatter list indicated by the selected LSLI (from block 240). The storage controller driver may populate the LBA scatter list based on the read requests gathered at block 230. For a given READ request in the pool of multiple READ requests, the storage control driver may populate a given entry in the LBA scatter list with the LBA, START_OFFSET and END_OFFSET, derived from the address and range of the individual read requests. A given entry in the LBA scatter list may correspond to a given read request. For example, an entry in the LBA scatter list may be a 64-bit value allocated as follows: 48 bits may specify the LBA of the READ, 8 bits may specify the START_OFFSET (of OFS size), and 8 bits may specify the END_OFFSET. END_OFFSET may be used to specify multiple adjacent offsets. For example, in a 4K block with 256B offsets, to READ an entire block, the START_OFFSET=0 and END_OFFSET=15.

Additionally, as the storage controller driver builds the LBA scatter list, it may also build a data pointer for the destination buffer in host memory. The data pointer may either be contiguous memory or a scatter gather list (SGL).

At block 260, the storage controller driver may send a subsequent command to the target storage device to cause the target storage device to calculate an address corresponding to a given list in the selected LBA scatter list array. The subsequent command may be a READ_LBA_SCATTER command. The READ_LBA_SCATTER command may include the LBA scatter list index (LSLI) previously selected (at block 240), the total data transfer bytes (TDTB) which may be the total number of bytes specified by all the entries in the LBA scatter list, scatter list count (SLC) which is the number of entries in the LBA scatter list.

The storage controller at the target storage device may receive the READ_LBA_SCATTER command. The storage controller may use the LBA scatter list index (LSLI) to calculate the address of the LBA scatter list from an address the storage controller saved during system initialization. The target storage device may then request a DMA transfer of the LBA scatter list from host memory into the shadow LBA scatter list.

Although FIG. 2 discloses a particular number of operations related to method 200, method 200 may be executed with greater or fewer operations than those depicted in FIG. 2. In addition, although FIG. 2 discloses a certain order of operations to be taken with respect to method 200, the operations comprising method 200 may be completed in any suitable order.

Figure 3:
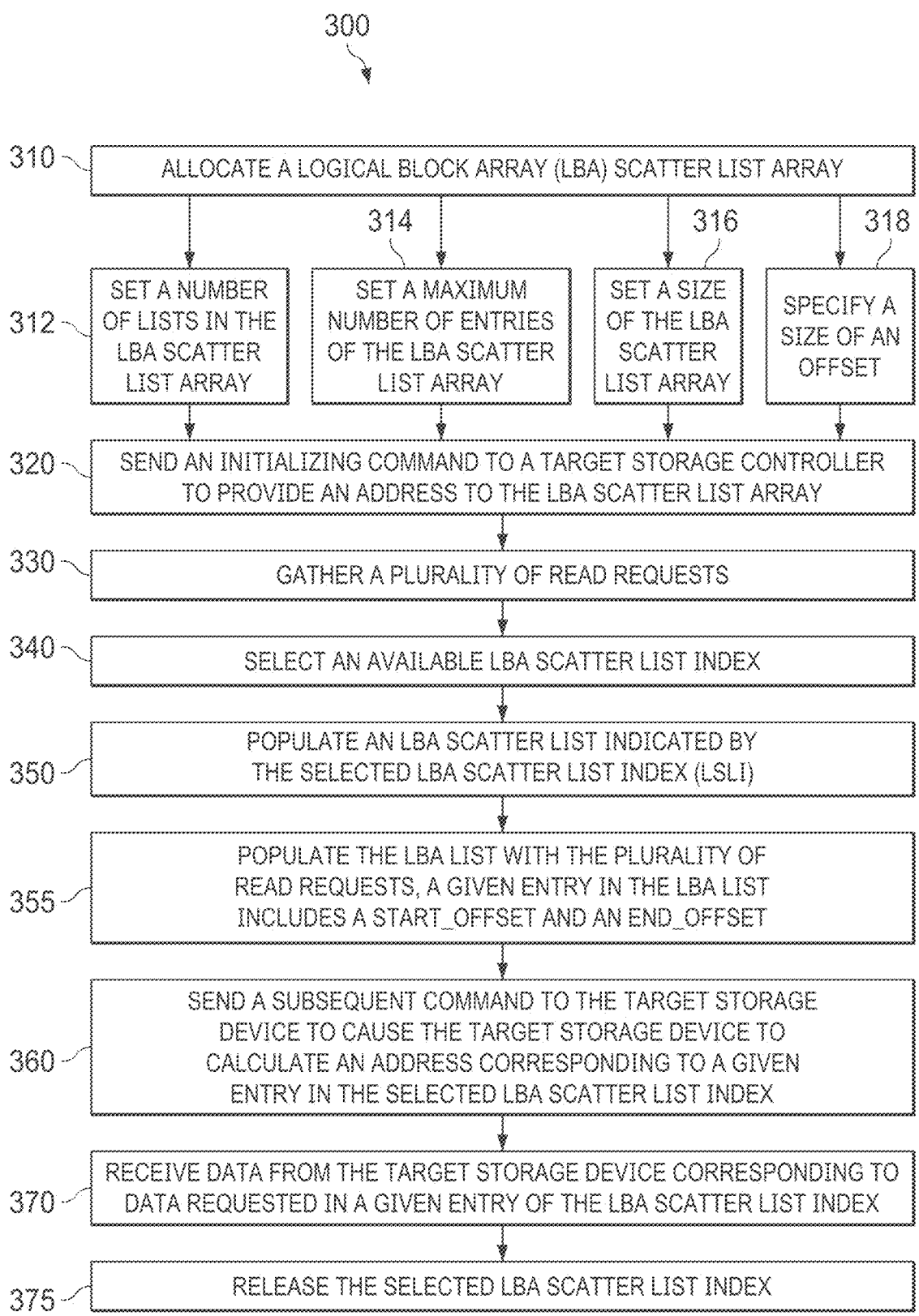
FIG. 3 illustrates a more detailed method performed for use of a logical block addressing (LBA) scatter list to calculate an address corresponding to an entry in the LBA scatter list, according to examples of the present disclosure.

FIG. 3 illustrates a more detailed method performed for use of a logical block addressing (LBA) scatter list to calculate an address corresponding to an entry in the LBA scatter list, according to examples of the present disclosure. Method 300 may be implemented using a driver on a host computer coupled to a block storage device, such as an SSD, in combination with a processor, or any other system operable to implement method 300. Although examples have been described above, other variations and examples may be made from this disclosure without departing from the spirit and scope of these disclosed examples.

At block 310, a storage control driver in a host computer, may allocate a logical block array (LBA) scatter list array. After allocating the LBA scatter list array, the storage controller driver may identify a given LBA scatter list by an entry in a list index (LSLI). The list index value may begin at "0" and have a maximum value of one less than the number of lists. In some examples, block 310 may occur during system or driver initialization.

At block 312, the storage control circuit may set the number of lists in the LBA scatter list array (NOL).

At block 314, the storage controller driver may set a maximum number of entries per list. The maximum number of entries in the LBA scatter list array may be indicated by a value reflecting a maximum number of entries per list (MLS), i.e., an MLS value.

At block 316, the storage controller driver may set a size of the scatter list array. The array may have a size of total list size (TLS) bytes of memory. The TLS may equal the MLS multiplied by the size of a single entry multiplied by the NOL. For example, the size of a single entry may be eight bytes. Blocks 312, 314, and 316 may occur in series or concurrently and may be part of the allocation of a LBA scatter list array (block 310).

At block 318, the storage controller driver may specify the size of the offset (OFS) in bytes. The OFS may be a parameter included in the initializing command (e.g., SET_LBA_SCATTER command) sent at block 320.

At block 320, the storage controller driver may send an initializing command to a target storage controller in a target storage device, to provide a base address of the LBA scatter list array. The initializing command may be a SET_LBA_S-CATTER command, described above. The SET_LBA_S-CATTER command may use an address of the LBA scatter list array as the data pointer, and provide the TLS, MLS and NOL values. In response to receiving the SET_LBA_SCAT-TER command, the storage controller may save the address to the LBA scatter list array in local memory at the target storage device, and may allocate TLS of internal memory as receive buffers for the LBA scatter list. The receive buffer may be referred to as the LBA scatter list shadow buffer.

At block 330, the storage controller driver may gather a plurality of read requests. The read requests may be generated by applications executing on the host computer and may seek data stored in scattered (e.g., random) locations on the target storage device. Block 330 may occur at run time.

At block 340, the storage controller driver may select an available LBA scatter list index, referenced by the index (LSLI). For example, there may be four LBA scatter lists allocated in the LBA scatter list array. Two of the LBA scatter lists may be in use, so the storage controller driver may select one of the other two LBA scatter lists at block 340.

At block 350, the storage controller driver may populate an LBA scatter list indicated by the selected LSLI (from block 340). The storage controller driver may populate the LBA scatter list based on the read requests gathered at block 330. For a given READ request in the pool of multiple READ requests, the storage controller driver may populate a given entry in the LBA scatter list with the LBA, START_OFFSET and END_OFFSET. A given entry in the LBA scatter list may correspond to a given read request. For example, an entry in the LBA scatter list may be a 64-bit value allocated as follows: 48 bits may specify the LBA of the READ, 8 bits may specify the START_OFFSET (of OFS size), and 8 bits may specify the END_OFFSET.

Additionally, as the storage controller driver builds the LBA scatter list, it may also build a data pointer for the destination buffer in host memory. The data pointer may either be contiguous memory or a scatter gather list (SGL).

At block 355, the storage controller driver may populate the LBA list with the plurality of read requests (gathered at block 330) where a given entry in the LBA list includes a START_OFFSET and an END_OFFSET.

At block 360, the storage controller driver may send a subsequent command to the target storage device to cause the target storage device to calculate an address corresponding to a given list in the selected LBA scatter list array. The subsequent command may be a READ_LBA_SCATTER command. The READ_LBA_SCATTER command may include the LBA scatter list index (LSLI) previously selected (at block 340), the total data transfer bytes (TDTB) which may be the total number of bytes specified by all the entries in the LBA scatter list, scatter list count (SLC) which is the number of entries in the LBA scatter list.

At block 370, the storage controller driver may receive data from the target storage device corresponding to the data requested in a given entry of the LBA scatter list index. The data requested in a given entry of the LBA scatter list index may be a given entry from the list populated at block 355. Specifically, the target storage device may send the data from a given entry of the LBA scatter list index (LSLI) to the host using a DMA transfer. The target storage device may send the data to the host computer on an entry-by-entry basis or the target storage device may stage all data from the LBA scatter list in internal memory, then initiate a single DMA transfer to host memory. The target storage device may send a single completion for the READ_LBA_SCATTER command to the storage controller driver.

At block 375, the storage controller driver may release the selected LBA scatter list index. By releasing the LBA scatter list index, the LBA scatter list index may be available for use with additional READ requests (e.g., available for selection at block 340). The storage controller driver may also inform the host computer that pending requests on the LBA scatter list are complete, and the data is available in host memory.

Although FIG. 3 discloses a particular number of operations related to method 300, method 300 may be executed with greater or fewer operations than those depicted in FIG. 3. In addition, although FIG. 3 discloses a certain order of operations to be taken with respect to method 300, the operations comprising method 300 may be completed in any suitable order.

Figure 4:
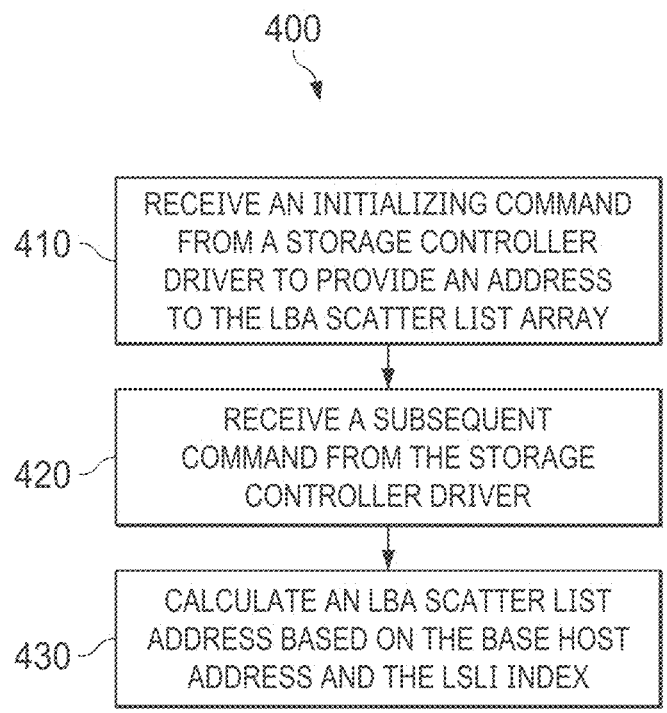
FIG. 4 illustrates a method performed for use of a logical block addressing (LBA) scatter list to calculate an address corresponding to an entry in the LBA scatter list, according to examples of the present disclosure.

FIG. 4 illustrates a method performed for use of a logical block addressing (LBA) scatter list to calculate an address corresponding to an entry in the LBA scatter list, according to examples of the present disclosure. Method 400 may be implemented using a storage controller on a block storage device, such as an SSD, in combination with a processor, or any other system operable to implement method 400. Although examples have been described above, other variations and examples may be made from this disclosure without departing from the spirit and scope of these disclosed examples.

At block 410, the storage controller may receive an initializing command from a storage controller driver on a host computer, providing a base address of the LBA scatter list array. The initializing command may be a SET_LBA_S-CATTER command, described above. The SET_LBA_S-CATTER command may use an address of the LBA scatter list array as the data pointer, and provide the TLS, MLS and NOL values.

At block 420, the storage controller may receive a subsequent command from the storage controller driver to cause the storage controller to calculate an address corresponding to a given list in the selected LBA scatter list array. The subsequent command may be a READ_LBA_SCATTER command. The READ_LBA_SCATTER command may include an LBA scatter list index (LSLI) previously selected (e.g., at block 240 in FIG. 2 or block 340 in FIG. 3), the total data transfer bytes (TDTB) which may be the total number of bytes specified by all the entries in the LBA scatter list, scatter list count (SLC) which is the number of entries in the LBA scatter list.

At block 430, the storage controller may calculate an LBA scatter list address based on the base host address and the LSLI index. The address of the LBA scatter list is the base address plus LSLI multiplied by MLS and 8 (the number of bytes in an entry). The storage controller may use the LBA scatter list index (LSLI) to calculate the host address from an address the target storage device saved during system initialization.

Although FIG. 4 discloses a particular number of operations related to method 400, method 400 may be executed with greater or fewer operations than those depicted in FIG. 4. In addition, although FIG. 4 discloses a certain order of operations to be taken with respect to method 400, the operations comprising method 400 may be completed in any suitable order.

Figure 5:
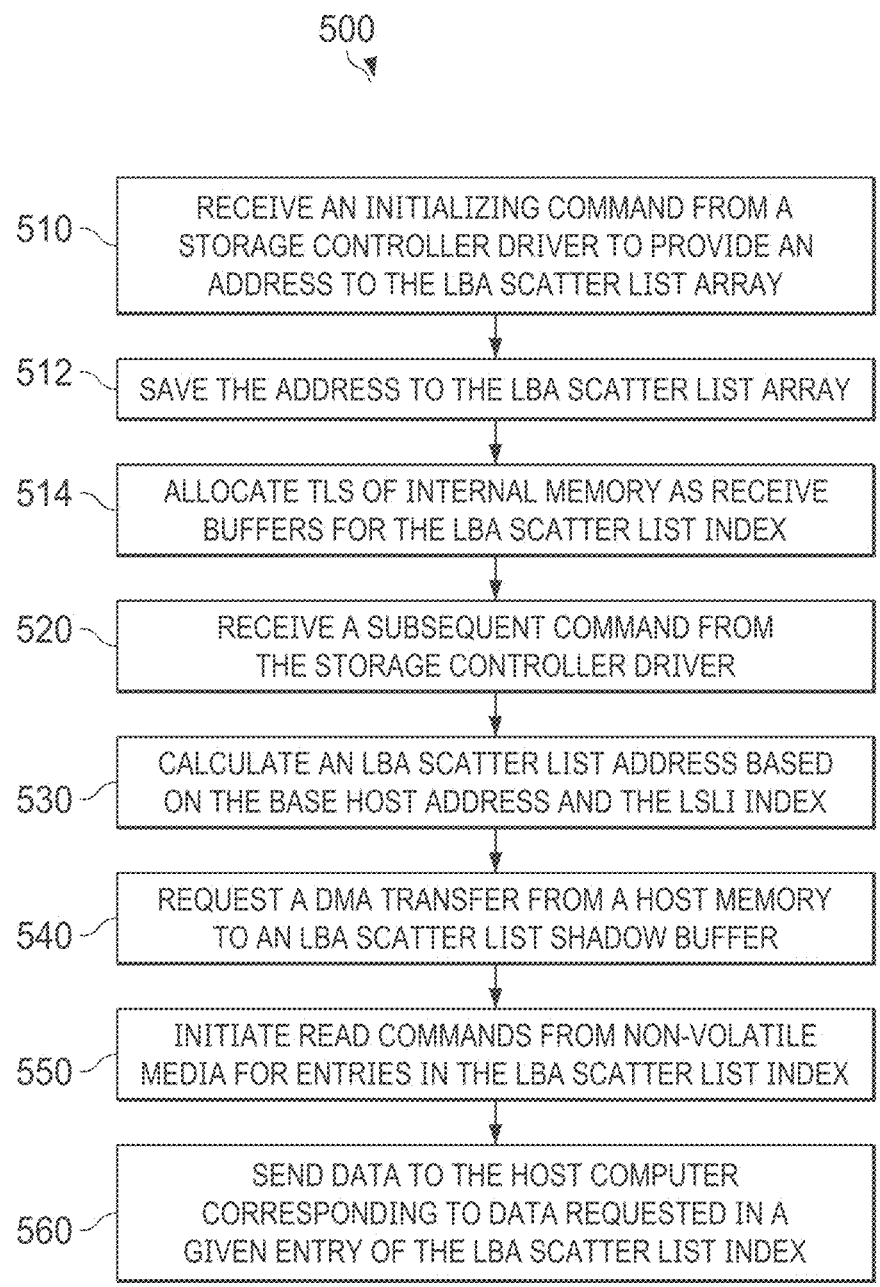
FIG. 5 illustrates a more detailed method performed for use of a logical block addressing (LBA) scatter list to calculate an address corresponding to an entry in the LBA scatter list, according to examples of the present disclosure.

FIG. 5 illustrates a more detailed method performed for use of a logical block addressing (LBA) scatter list to calculate an address corresponding to an entry in the LBA scatter list, according to examples of the present disclosure. Method 500 may be implemented using a storage controller on a block storage device, such as an SSD, in combination with a processor, or any other system operable to implement method 500. Although examples have been described above, other variations and examples may be made from this disclosure without departing from the spirit and scope of these disclosed examples.

At block 510, the storage controller may receive an initializing command from a storage controller driver on a host computer, providing a base address of the LBA scatter list array. The initializing command may be a SET_LBA_S-CATTER command, described above. The SET_LBA_S-CATTER command may use an address of the LBA scatter list array as the data pointer, and provide the TLS, MLS and NOL values.

At block 512, in response to receiving the SET_LBA_S-CATTER command, the storage controller may save the address to the LBA scatter list array in local memory at the target storage device.

At block 514, the storage controller may allocate TLS of internal memory as receive buffers for the LBA scatter list based on the SET_LBA_SCATTER command. The receive buffer may be referred to as the shadow LBA scatter list.

At block 520, the storage controller may receive a subsequent command from the storage controller driver to cause the storage controller to calculate an address corresponding to a given list in the selected LBA scatter list array. The subsequent command may be a READ_LBA_SCATTER command. The READ_LBA_SCATTER command may include an LBA scatter list index (LSLI) previously selected (e.g., at block 240 in FIG. 2 or block 340 in FIG. 3), the total data transfer bytes (TDTB) which may be the total number of bytes specified by all the entries in the LBA scatter list, scatter list count (SLC) which is the number of entries in the LBA scatter list.

At block 530, the storage controller may calculate an LBA scatter list address based on the base host address and the LSLI index. The address of the LBA scatter list is the base address plus LSLI multiplied by MLS and 8 (the number of bytes in an entry). The storage controller may use the LBA scatter list index (LSLI) to calculate the host address from an address the target storage device saved during system initialization.

At block 540, the storage controller may request a DMA transfer of the LBA scatter list from a host memory to the shadow LBA scatter list.

At block 550, after the DMA transfer copies the LBA scatter list to the shadow LBA scatter list, the storage controller may initiate READ commands from non-volatile media for the entries in the LBA scatter list.

At block 560, the storage controller may send data to the host computer corresponding to the data requested in a given entry of the LBA scatter list index. Specifically, the storage controller may send the data from a given entry of the LBA scatter list index (LSLI) to the host using a DMA transfer. The storage controller may send the data to the host computer on an entry-by-entry basis or the storage controller may stage all data from the LBA scatter list in internal memory, then initiate a single DMA transfer to host memory. The storage controller may send a single completion for the READ_LBA_SCATTER command to the storage controller driver.

Although FIG. 5 discloses a particular number of operations related to method 500, method 500 may be executed with greater or fewer operations than those depicted in FIG. 5. In addition, although FIG. 5 discloses a certain order of operations to be taken with respect to method 500, the operations comprising method 500 may be completed in any suitable order.

Although examples have been described above, other variations and examples may be made from this disclosure without departing from the spirit and scope of these disclosed examples.

The invention claimed is:

1. An article of manufacture comprising:
a non-transitory memory including machine-readable instructions that, when executed by a processor, cause the processor to:
allocate a logical block array (LBA) scatter list array;
send an initializing command to a target storage device, the initializing command to provide to the target storage device an address to the LBA scatter list array;
gather a plurality of read requests;
select an available LBA scatter list index;
populate a LBA list indicated by the selected LBA scatter list index; and
send a subsequent command to the target storage device to cause the target storage device to calculate an address corresponding to a given entry in the selected LBA scatter list index.

2. The article of manufacture of claim 1, wherein allocating the LBA scatter list array includes setting a size of the LBA scatter list array, a maximum number of entries of the LBA scatter list array, and a number of lists in the LBA scatter list array.

3. The article of manufacture of claim 1, wherein the processor is to specify a size of an offset.

4. The article of manufacture of claim 1, wherein populating the LBA list includes populating the LBA list with the plurality of read requests.

5. The article of manufacture of claim 1, wherein the given entry in the LBA list includes an START_OFFSET and an END_OFFSET.

6. The article of manufacture of claim 1, wherein the processor is to:
receive data from the target storage device corresponding to data requested in the given entry of the LBA scatter list index; and
release the selected LBA scatter list index.

7. The article of manufacture of claim 1, wherein the subsequent command causes the target storage device to:
calculate an LBA scatter list address based on a base host address and an LSLI index; and
request a DMA transfer from a host memory to an LBA scatter list shadow buffer.

8. A method comprising:
allocating a logical block array (LBA) scatter list array;
sending an initializing command to a target storage device, the initializing command to provide to the target storage device an address to the LBA scatter list array;
gathering a plurality of read requests;
selecting an available LBA scatter list index;
populating a LBA list indicated by the selected LBA scatter list index; and
sending a subsequent command to the target storage device to cause the target storage device to calculate an address corresponding to a given entry in the selected LBA scatter list index.

9. The method of claim 8, wherein allocating the LBA scatter list array includes setting a size of the LBA scatter list array, a maximum number of entries of the LBA scatter list array, and a number of lists in the LBA scatter list array.

10. The method of claim 8, comprising specifying a size of an offset.

11. The method of claim 8, wherein populating the LBA list includes populating the LBA list with the plurality of read requests.

12. The method of claim 8, wherein the given entry in the LBA list includes an START_OFFSET and an END_OFFSET.

13. The method of claim 8, comprising:
receiving data from the target storage device corresponding to data requested in the given entry of the LBA scatter list index; and
releasing the selected LBA scatter list index.

14. The method of claim 8, wherein the subsequent command causes the target storage device to:
calculate an LBA Scatter List address based on a base host address and an LSLI index; and
request a DMA transfer from a host memory to an LBA scatter list shadow buffer.

15. A method comprising:
receiving an initializing command providing an address to a logical block array (LBA) scatter list array;
receiving a subsequent command providing an LBA scatter list index and a base host address; and
calculating an LBA scatter list address based on the base host address and the LBA scatter list index.

16. The method of claim 15, comprising saving the LBA scatter list address.

17. The method of claim 15, comprising allocating a total list size (TLS) of internal memory as a receive buffer for the LBA scatter list index.

18. The method of claim 15, comprising initiating a read command from non-volatile media for an entry in the LBA scatter list index.

19. The method of claim 15, comprising sending data to a host computer corresponding to data requested in an entry in the LBA scatter list index.

20. The method of claim 15, comprising requesting a DMA transfer from a host memory to an LBA scatter list shadow buffer.

* * * * *